United States Patent [19]
Mochizuki et al.

[11] Patent Number: 5,706,816
[45] Date of Patent: Jan. 13, 1998

[54] IMAGE PROCESSING APPARATUS AND IMAGE PROCESSING METHOD FOR USE IN THE IMAGE PROCESSING APPARATUS

[75] Inventors: Takashi Mochizuki; Mutsuhiro Akahane, both of Mitaka, Japan

[73] Assignee: Aloka Co., Ltd., Japan

[21] Appl. No.: 682,909

[22] Filed: Jul. 16, 1996

[30] Foreign Application Priority Data

Jul. 17, 1995 [JP] Japan .................................. 7-180107
May 21, 1996 [JP] Japan .................................. 8-125341

[51] Int. Cl.⁶ .................................................. A61B 8/00
[52] U.S. Cl. .................................. 128/660.07; 128/916
[58] Field of Search ........................ 128/916, 660.07, 128/661.01; 364/413.25

[56] References Cited

U.S. PATENT DOCUMENTS

| | | | |
|---|---|---|---|
| 4,271,706 | 6/1981 | Ledley | 128/916 X |
| 5,353,354 | 10/1994 | Keller et al. | 364/413.25 |
| 5,413,106 | 5/1995 | Fujita et al. | 128/916 |
| 5,488,952 | 2/1996 | Schoolman | 128/916 |

*Primary Examiner*—Francis Jaworski
*Attorney, Agent, or Firm*—Marger, Johnson, McCollom & Stolowitz, P.C.

[57] ABSTRACT

An image processing apparatus includes an ultrasound transducer for sequentially emitting ultrasound beams and receiving respective echoes of the ultrasound beams to produce a scanning plane; a mechanism for displacing the ultrasound transducer to move the scanning plane in a three-dimensional region; a three-dimensional image data generator for sequentially obtaining echo data of the respective ultrasound beams from the echo of the respective ultrasound beams upon receipt of the echo by the ultrasound transducer, and for sequentially generating, based on the echo data of the respective ultrasound beams, brightness value data for each ultrasound beam corresponding to a brightness value for one [1] pixel in an ultrasound image for the three-dimensional region; a memory, having addresses corresponding to respective pixels in the ultrasound image, for sequentially storing the brightness value data for the respective ultrasound beams generated by the three-dimensional image data generator at the corresponding addresses thereof; and a display for displaying the ultrasound image based on the brightness value data stored in the memory. This apparatus can produce a new three-dimensional ultrasound image having properties of both a stereographic surface image and a stereographic transparent image like an X-ray in a real time.

23 Claims, 6 Drawing Sheets

IMAGE PROCESSING APPARATUS AND IMAGE PROCESSING METHOD FOR USE IN THE IMAGE PROCESSING APPARATUS

BACKGROUND OF THE INVENTION

1. Field of the Invention

This invention relates to an image processing apparatus and an ultrasound image processing method for use in the image processing apparatus, and more specifically relates to an ultrasound image processing apparatus capable of selectively displaying, on real time basis when necessary, an object placed in a three-dimensional region in the form of a stereoscopic surface image or in the form of a stereoscopic transparent image, and an ultrasound image processing method for use in the ultrasound image processing apparatus.

This invention can be applied, for example, to an ultrasound diagnostic apparatus for diagnosing a living body. In such case, the ultrasound image processing apparatus can selectively produce, on real time basis when necessary, not only a stereoscopic surface image of an object such as an internal organ or a fetus, but also a stereoscopic transparent image which shows the entrails of an object in a transparent manner like an X-ray image. In addition, an image of the object to be displayed can be changed from a stereoscopic surface image to a stereoscopic transparent image sequentially as the need arises, thereby allowing a desired image to be observed. Furthermore, the ultrasound image processing apparatus of this invention can also be applied to fault detectors, fish school detectors, sonar devices and the like. In such applications, the image processing apparatus can also selectively form and display, on real time basis when necessary an image of an object placed in a three-dimensional region in the form of a stereoscopic surface image or in the form of a stereoscopic transparent image showing the entrails of the object in a transparent manner.

2. Description of the Background Art

In the field of image processing apparatuses which utilize ultrasound waves, there are known ultrasound diagnostic apparatuses, fault detectors, fish school detectors and sonar devices and the like. Hereinbelow, a background of the present invention will be discussed with reference to an ultrasound diagnostic apparatus which is considered to be the most practical application of the present invention.

An ultrasound diagnostic apparatus emits ultrasound beams from an ultrasound probe to a part of a patient to be diagnosed and receives echoes reflected therefrom to display an image of the internal tissues of the patient on a screen based on the received echoes. In such an ultrasound diagnostic apparatus, the image of the tissues is normally displayed with a real time tomographic image which is called a B mode image. In such a B mode image, a section of an internal tissue being examined is shown by changes in brightness levels. Namely, an ultrasound tomographic image (B mode image) only visualizes, as a two-dimensional image, information on a scanning plane along which ultrasound beams are scanned. Hence, in the case of a B mode image, the whole structure of a diagnosed part to be examined cannot be displayed with a single image. Therefore, when another part of the diagnosed part is required to be examined, it is necessary to change the scanning plane by displacing and tilting the ultrasound probe.

However, because such a change in the scanning plane merely produces a tomographic image along the changed scanning plane, it has still been impossible for an operator to grasp the whole of the diagnosed part of the patient three-dimensionally (spatially).

In view of the problems described above, an ultrasound diagnostic apparatus which can produce a three-dimensional ultrasound image which visualizes a diagnosed part three-dimensionally has been proposed. In such apparatus, a scanning plane formed by an electronic scan by an ultrasound probe having an array transducer is moved to a direction perpendicular to the scanning plane to produce a three-dimensional scanning region, and a three-dimensional ultrasound image is produced by processing echoes reflected from the three-dimensional scanning region.

As one of the methods for producing such a three-dimensional image, an ultrasound image processing method utilizing a surface rendering technique is known. In this method, a three-dimensional region in which an object to be examined is placed is first scanned by ultrasound beams emitted from a transducer, and echoes reflected therefrom are received by the transducer. Next, the surface of the object placed in the three-dimensional region is determined based on echo data obtained from the received echoes, and the surface is defined using three-dimensional coordinate values (x, y, z) based on the echo data. The obtained coordinate value data are stored in a geometry data memory. Then, an enormous number of infinitesimal planes (usually infinitesimal triangles) are defined on the surface of the object based on the stored coordinate value data so as to represent the surface of the object using such infinitesimal planes. Thereafter, it is assumed that a light source wherefrom the ultrasound beams are projected is placed at a particular position that is considered to be a viewpoint from which the object is being seen, and that the surface of the object is illuminated by light from such light source. Then, a brightness value of the respective infinitesimal planes is determined based on an angle defined between a light beam from the light source and each infinitesimal plane on the surface of the object, that is, an angle between the line of vision and each infinitesimal plane. The three-dimensional surface image of the object is then computed based on the thus-obtained brightness values of the respective infinitesimal planes.

However, this method requires a fair amount of computing time for processing the data to form a three-dimensional image due to the necessity of setting an enormous number of infinitesimal planes from an enormous amount of coordinate value data stored in a geometry data memory. Actually, even if a computer capable of high speed processing is used, it still requires more than several minutes to compute the necessary data, which renders a real time processing impossible. Further, because of an expensive computer capable of high speed processing is required, the use of this method made it difficult to provide a practical image processing apparatus at a low cost. Furthermore, because in this method only data on the surface of an object such as a fetus are extracted for stereoscopically displaying the surface of the object with changes in brightness levels, it can only display a stereographic surface image of the object. This means that an ultrasound diagnostic apparatus using this method can not produce a transparent image showing the inside of the object (like an X-ray image). It has a further problem in that it can not visualize an unclear boundary of a surface of an object (i.e., a boundary of two substances which have similar acoustic impedances), because it is difficult to identify coordinate values at the surface due to little change in their echoes.

As described above, the conventional apparatus for obtaining a three-dimensional ultrasound image, although capable of stereoscopically displaying a surface of an object, not only has problems with regard to real time performance and manufacturing costs, but also has a limited ability to visualize the surface shape of an object.

Another approach proposed for obtaining a three-dimensional ultrasound image is shown, for example, in Japanese Laid-Open Patent No. HEI 5-245146. In this method, echo data obtained from a number of sampling points along a projected ultrasound beam are multiplied to determine a brightness value of the ultrasound beam, and a three-dimensional image is produced based on the thus-obtained brightness value of the respective ultrasound beams.

However, this method also involves the same problems with respect to real time performance and manufacturing costs as the method described above, because this method also requires a three-dimensional echo data memory similar to the geometry data memory in order to process the enormous amount of echo data.

SUMMARY OF THE INVENTION

This invention has been made in view of the problems involved in conventional apparatuses. Accordingly, a main object of the present invention is to provide an ultrasound image processing apparatus and an ultrasound image processing method capable of producing a three-dimensional ultrasound image on real time basis.

Another object of the present invention is to provide an ultrasound image processing apparatus and an ultrasound image processing method which can be manufactured at a relative low cost so as to be suitable for practical use.

Yet another object of the present invention is to provide an ultrasound image processing apparatus and an ultrasound image processing method which is capable of forming a stereoscopic transparent image which shows the entrails of an object such as a living body in a transparency manner like an X-ray image in addition to a stereoscopic surface image of the object.

Other object of the present invention is to provide an ultrasound image processing apparatus and an ultrasound image processing method which enables observable distance (depth) in the stereoscopic transparent image of the object to be freely adjusted.

Yet other object of the present invention is to provide an ultrasound image processing apparatus and an ultrasound image processing method which is capable of selectively displaying a stereoscopic surface image or a stereoscopic transparent image of the object.

In order to achieve the above mentioned objects, an ultrasound image processing apparatus according to the present invention, comprises:

(a) an ultrasound transducer for sequentially emitting ultrasound beams and receiving respective echoes of the ultrasound beams within a scanning plane;

(b) a mechanism for displacing the ultrasound transducer to move the scanning plane in a three-dimensional region;

(c) a three-dimensional image data generator for sequentially obtaining echo data of the respective ultrasound beams from the echo of the respective ultrasound beams upon receipt of the echo by the ultrasound transducer, and for sequentially generating, based on the echo data of the respective ultrasound beams, brightness value data for each ultrasound beam corresponding to a brightness value for one [1] pixel in an ultrasound image for the three-dimensional region;

(d) a memory, having addresses corresponding to respective pixels in the ultrasound image, for sequentially storing the brightness value data for the respective ultrasound beams generated by the three-dimensional image data generator at the corresponding addresses thereof; and (e) a display for displaying the ultrasound image of the three-dimensional region, based on the brightness value data stored in the memory.

In the ultrasound image processing apparatus having the above structure, the brightness value data which corresponds to a brightness value P(x,y) at one [1] pixel of an ultrasound image from the echo data of the respective ultrasound beams are obtained. Therefore, the apparatus can sequentially generate such brightness value data for the respective beams in the order of receiving the echo data thereof. As a result, while simultaneously scanning the three-dimensional region, it is possible to produce and display a three-dimensional ultrasound image for the three-dimensional region in substantially real time. Also, because the apparatus processes the echo data for the respective ultrasound beams and stores the processed data sequentially in a memory such as a frame memory, it no longer requires the provision of an expensive memory such as a conventional echo data memory (geometrical memory), whereby it becomes possible to lower manufacturing costs and provide practical inexpensive machines.

Also, the ultrasound image processing apparatus of the present invention can utilize, as lines of vision, the ultrasound beams emitted toward the three-dimensional region. This configuration makes it possible to produce an ultrasound image corresponding to an image formed on a mapping plane which is virtually set at positions on which the ultrasound beams passing through the three-dimensional region are projected. The thus-obtained image is similar to the one obtained by viewing the three-dimensional region from a point where the ultrasound beams are being emitted. In other words, it is possible to produce a three-dimensional ultrasound image which visualizes an object placed in the three-dimensional region in such a manner that the object is being seen from such point.

In addition, in the ultrasound image processing apparatus of the present invention, the three-dimensional image data generator may further comprise a transparent image data generator. The transparent image data generator generates transparent image data upon receipt of the echo of the respective ultrasound beams. The transparent image data reflects a change of strength of the echo in the respective echo data at a plurality of sampling points of the ultrasound beam along the beam projecting direction thereof to the brightness value data for the ultrasound beam in such a way that such a change is visualized in the brightness value at the corresponding pixel of the ultrasound image.

This transparent image data generator obtains a quantity of outputted light at each of the plurality of sampling points from respective echo data at each of the plurality of sampling points on the ultrasound beam; sequentially operates the quantity of the outputted light at each of the plurality of sampling points along the beam projecting direction; and determines the brightness value data for the ultrasound beam, based on the result of the above operation.

Because this configuration makes it possible to reflect a change of strength of the echo in the respective echo data at a plurality of sampling points (voxels) of the ultrasound beam along the beam projecting direction thereof to the brightness value data for the ultrasound beam in such a way that such a change is visualized in the brightness value at the corresponding pixel of the ultrasound image, it is possible to produce a three-dimensional ultrasound image which represents the entrails of an object placed in the three-dimensional region in a transparent manner like an X-ray image having a feeling of depth. In this regard, it is to be noted that an experiment confirmed that this ultrasound image has transparent image properties and three-dimensional stereoscopic image properties.

In the present invention, it is preferred that the transparent image data generator includes:

- an opacity operator for obtaining, from the echo data at each of the plurality of sampling points on the ultrasound beam, an opacity at each of the plurality of sampling points, the opacity being defined by a value of the respective echo data;
- a transparency operator for obtaining, from the echo data at each of the plurality of sampling points on the ultrasound beam, a transparency at each of the plurality of sampling points, the transparency being defined by the value of the respective echo data;
- a quantity of luminescence operator for obtaining a quantity of luminescence at each of the plurality of sampling points, the quantity of luminescence being obtained by multiplying the echo data at each of the plurality of sampling points by the opacity; and
- a quantity of transmitted light operator for obtaining a quantity of transmitted light at each of the plurality of sampling points, the quantity of transmitted light being obtained by multiplying the transparency at each of the plurality of sampling points by a quantity of outputted light at its immediately preceding sampling point; wherein the quantity of outputted light at each of the plurality of sampling points is obtained by adding the quantity of luminescence to the quantity of transmitted light.

In this case, it is also preferred that the opacity be defined as a function of the echo data and that an opacity varying means be further provided for varying a coefficient included in the function.

The above configuration of the ultrasound image processing apparatus and the appropriate variation of the opacity adjustment coefficient enables a display of an object placed in a three-dimensional region to be sequentially varied from the stereoscopic surface image to the stereoscopic transparent image like an X-ray image as described above or vice versa as necessary. Hence, if the present invention is applied to an ultrasound diagnostic apparatus for diagnosing a fetus or the like, it is possible to selectively observe a desired part of a fetus through a stereoscopic surface image thereof or a stereoscopic transparent image thereof as necessary. This is advantageous in diagnosing any abnormality of a fetus. Furthermore, its application, for example, to a fault detector also allows a necessary part of an object placed in a three-dimensional region to be shown in a transparent manner through a stereoscopic transparent image of its entrails, which enhances the performance of such a fault detector.

The present invention is also directed to an ultrasound image processing method. This method comprises the steps of:

- (a) projecting a plurality of ultrasound beams from an ultrasound transducer sequentially to a three-dimensional region, and receiving their echoes by the ultrasound transducer;
- (b) sequentially obtaining echo data for the respective ultrasound beams from the echo of the respective ultrasound beams upon receipt of the echo by the ultrasound transducer, and sequentially generating, based on the echo data of the respective ultrasound beams, brightness value data for each ultrasound beam corresponding to a brightness value for one [1] pixel in an ultrasound image for the three-dimensional region;
- (c) sequentially storing the brightness value data for the respective ultrasound beams at predetermined addresses In a memory; and
- (d) displaying an ultrasound image in the said three-dimensional region, based on the brightness value data for each of the plurality of ultrasound beams stored in the memory, the ultrasound image being represented as if the plurality of ultrasound beams are utilized as lines of vision.

The ultrasound image processing method described above allows a three-dimensional ultrasound image to be formed on real time basis. Further, the method also makes it possible to obtain a three-dimensional surface image of an object placed in a three-dimensional region, as well as a stereoscopic transparent image like an X-ray image showing the entrails of the object.

The other aspect of the present invention is also directed to an ultrasound image processing apparatus. The apparatus comprises:

- (a) an ultrasound transducer means for sequentially projecting ultrasound beams along a scanning plane and for receiving respective echoes of the projected ultrasound beams projected;
- (b) a mechanism for displacing the ultrasound transducer along a three-dimensional region including the scanning plane;
- (c) a generator for sequentially generating, based on echo data obtained from the echo of the respective ultrasound beams, brightness value data for each ultrasound beam corresponding to a brightness value for one [1] pixel in an ultrasound image of the three-dimensional region, the brightness value data reflecting a change of strength of the echo in the respective echo data at a plurality of sampling points of each respective beam along the beam projecting direction thereof so that such a change is visualized in the brightness value at the corresponding pixel;
- (d) a means, having predetermined addresses for the respective pixels in the ultrasound image, for sequentially storing brightness value data for the respective ultrasound beams generated by the generator at the predetermined addresses; and
- (e) a display for displaying an ultrasound image of the three-dimensional region, based on the brightness value data stored in the memory.

Further, an other aspect of the present invention is also directed to an image processing apparatus. The apparatus comprises:

- (a) means for sequentially emitting beams toward a three-dimensional region and receiving the reflected beams;
- (b) means for sequentially generating brightness value data for each of the received beams each time when the beam is received;
- (d) memory means having predetermined addresses corresponding to the respective beams, the memory means sequentially storing the brightness value data for the respective beams generated by the brightness value data generating means at the corresponding predetermined addresses; and
- (e) display means for displaying an image of the three-dimensional region, based on the brightness value data stored in the memory means, in which the image is composed of a plurality of pixels, and these pixels correspond to the beams, respectively.

One of an ordinary skill in the art can easily understand additional and other features and objects of the present invention from the following description of the preferred embodiments and the attached drawings.

DETAILED DESCRIPTION OF THE PREFERRED EMBODIMENTS

Described below is a preferred embodiment of the present invention with reference to the attached drawings. In this regard, it should be understood that, although the following description is made with reference to the case where the present invention is applied to an ultrasound diagnostic apparatus for medical use, the application of the present invention is by no means limited only to such an ultrasound diagnostic apparatus.

Figure 1:
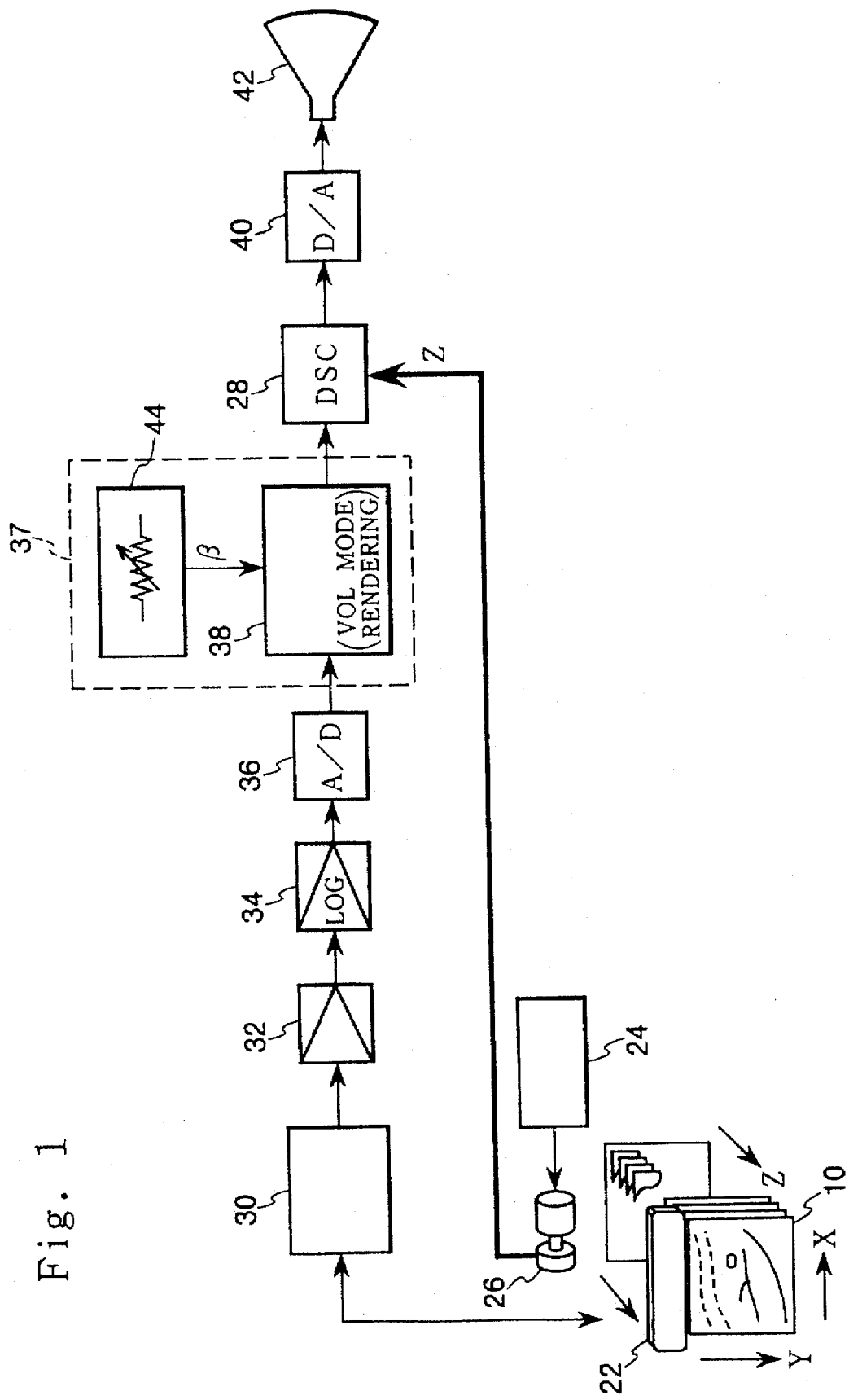
FIG. 1 is a block diagram which shows the overall structure of an ultrasound image processing apparatus of the present invention.

FIG. 1 is a block diagram illustrating the overall structure of an ultrasound image processing apparatus of the present invention.

An ultrasound probe 22 comprises a transducer for emitting ultrasound beams to an object such as a living body and for receiving the beams that are reflected from an internal tissue thereof, that is, echoes. In this embodiment, the ultrasound probe 22 has a linear type array transducer.

Figure 2B:
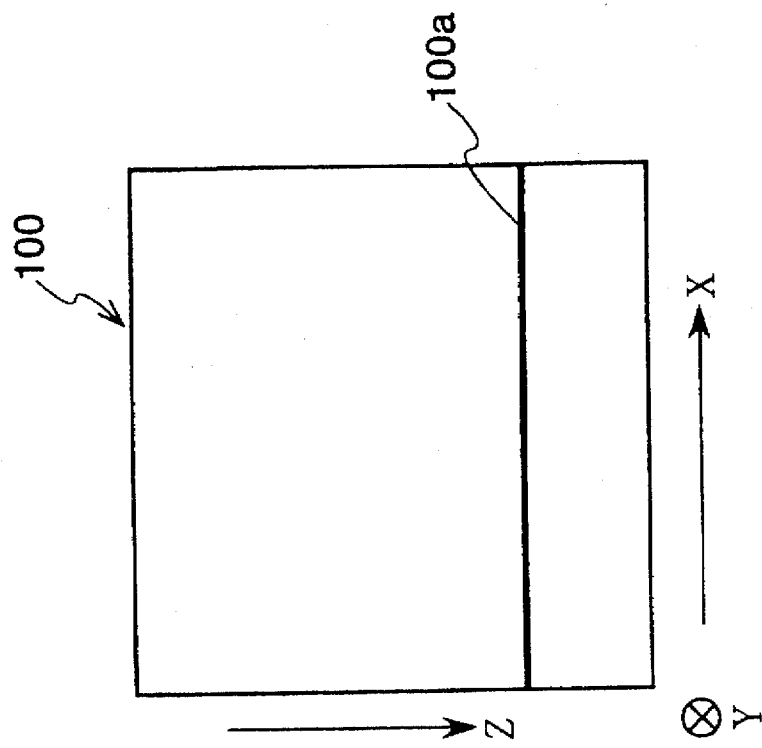
FIG. 2B is an illustration which explains a three-dimensional ultrasound image obtained according to the present invention.
Figure 2A:
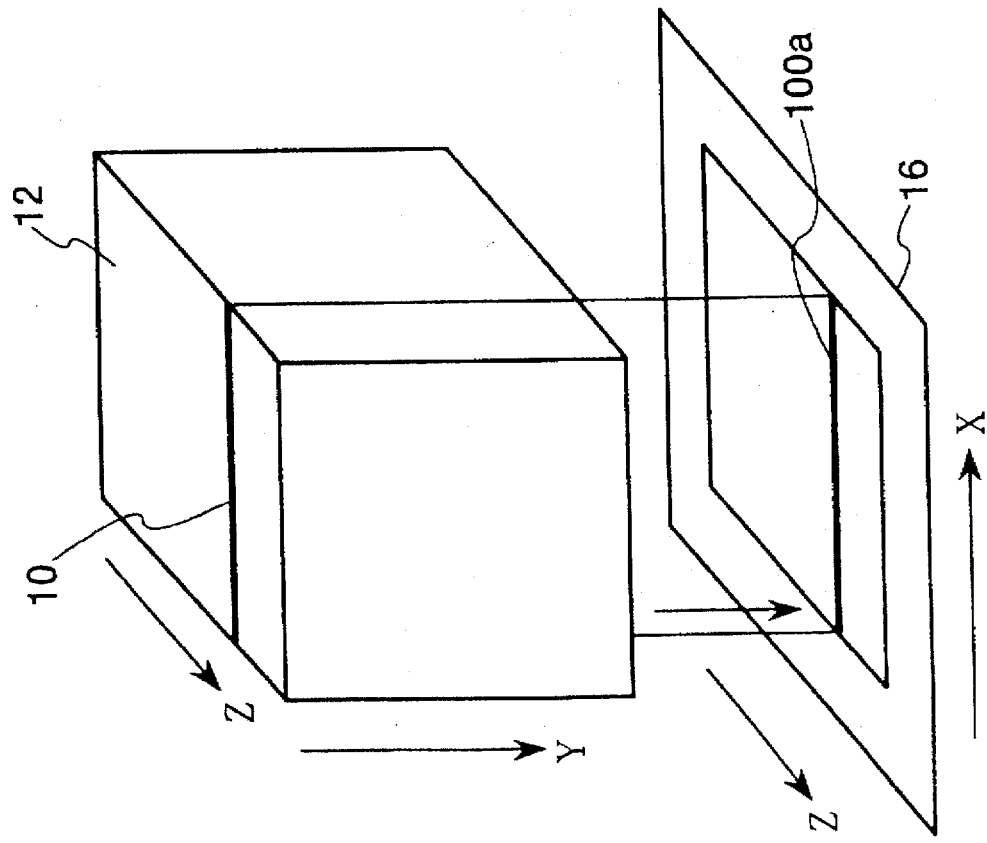
FIG. 2A is an illustration which explains a relationship between a three-dimensional region and a projected image.

By electronically scanning the linear array transducer of the ultrasound probe 22, a scanning plane 10 is formed in an X-Y plane as shown in FIG. 2A. Further, by mechanically scanning the ultrasound probe 22 in the Z direction, the scanning plane 10 is displaced in the Z direction, which forms a three-dimensional echo data acquiring region 12 as shown in FIG. 2A (hereinafter, referred to as "three-dimensional region").

In this embodiment, such a mechanical scanning is carried out through a driver 24. During the mechanical scanning, a rotary encoder 26 detects a position of the ultrasound probe 22 in the Z direction and produces Z coordinate data for the ultrasound probe 22. This Z coordinate data is fed to a digital scan converter (DSC) 28 (described later), and the Z coordinate data is used in the DSC 28 for writing brightness value data in a frame memory provided therein.

By mechanically scanning the ultrasound probe 22 in the Z direction while emitting ultrasound beams to an object and receiving echoes of the beams reflected from the object, it is possible to obtain the echoes from the three-dimensional region 12.

In this embodiment, a description is made with reference to a case where the ultrasound probe 22 is mechanically driven in the Z direction by means of the driver 24. However, it goes without saying that the ultrasound probe 22 is moved manually by an operator to perform a scanning in the Z direction. In this case, it is also necessary to acquire a Z coordinate data of the ultrasound probe 22 using an appropriate means.

In addition, although in this embodiment an ultrasound probe having a linear array transducer is used, it is also possible to use other types of ultrasound probes having a convex type or a sector type array transducer for three-dimensional scanning. Examples of such an ultrasound probe are disclosed, for example, in U.S. Pat. No. 5,460,179 and U.S. Pat. No. 5,152,294. In such cases, the Z coordinate data, that is, the yawing angle data of the probe, is sent to the digital scan converter (DSC) 28.

Turning now to the FIG. 1, a signal transmission and reception section 30 supplies a transmission signal to the ultrasound probe 22 to energize the transducer to emit ultrasound beams. The signal transmission and reception section 30 also receives an echo signal produced based on echoes of the reflected beams received by the transducer of the ultrasound probe 22. An echo signal outputted from the signal transmission and reception section 30 is first amplified by an amplifier 32, and then it is logarithmically amplified by a LOG amplifier 34. The provision of the LOG amplifier 34 improves the quality of an ultrasound image. An A/D converter 36 converts the echo signal into a digital signal. Then, the converted digital data (hereinafter, referred to as "echo data") are sent to a three-dimensional image data generator 37.

The three-dimensional image data generator 37 comprises an image processor 38 as a transparent image data generator. The three-dimensional image data generator 37 processes echo data obtained from the received echoes of the respective ultrasound beams sequentially to ultimately produce brightness value data for the respective ultrasound beams each time the echo of the respective ultrasound beams emitted to the three-dimensional region is received (This will be described later in further detail with reference to FIG. 7 and FIG. 8). The thus-produced brightness value data is used as a brightness value $P(x,y)$ of a pixel in an ultrasound image. The pixel is designated so as to correspond to the ultrasound beam of which echo data has been processed.

Further, the image processor 38 is constructed so as to receive an opacity adjustment coefficient $\beta$ determined by the opacity adjuster 44 (This will also be described later in further detail). An appropriate selection of the value for the opacity adjustment coefficient $\beta$ allows the opacity $\alpha$ at each sampling point (voxel) in a beam direction to be set as desired.

The brightness value data thus obtained by the three-dimensional image data generator 37 corresponding to respective ultrasound beams is sequentially outputted to the DSC 28 and then written into predetermined addresses of the frame memory in the DSC 28. Namely, this frame memory has X-Y addresses corresponding to the pixels of a display screen for displaying an ultrasound image on a one-to-one basis. Therefore, a series of the brightness value data of the respective ultrasound beams projected toward the three-dimensional region are made to be written sequentially into corresponding predetermined addresses, respectively. Namely, upon completing a scan for the three-dimensional region, the frame memory of the DSC 28 stores the brightness value data (scan data) of the ultrasound beams projected toward the three-dimensional region, that is, ultrasound image data for a single frame of a three-dimensional ultrasound image.

In this case, as described above, the respective ultrasound beams are identified by X-Z coordinates, and the brightness value data for the respective ultrasound beams are written into corresponding predetermined X-Y addresses in the frame memory, respectively (Refer to FIG. 2A and FIG. 2B.).

Ultrasound image data read from the DSC 28, after having been converted by a D/A converter 40 into an analog signal, are sent to a display 42 such as a CRT. Then, the display 42 displays a three-dimensional ultrasound image according to the present invention.

Hereinbelow, descriptions are made with reference to a generation of real time three-dimensional image data and a generation of transparent image data performed by the above described three-dimensional image data generator 37, the image processor 38 and the opacity adjuster 44.

Generation of real time three-dimensional image data

As stated above, FIG. 2A is an illustration which shows a relationship between a three-dimensional region 12 and a projected image.

As shown in FIG. 2A, when an ultrasound beam emitted in the Y direction is scanned in the X direction, a scanning plane 10 is formed on the X-Y plane. Further, the scanning plane 10 is moved in the Z direction to perform a mechanical scan, and a three-dimensional region 12 (a three-dimensional echo data acquiring region) is produced. Each time when the echo of an ultrasound beam projected toward the three-dimensional region 12 is received, an image processing operation for generating brightness value data for the ultrasound beam is carried out. If the thus-obtained brightness value data for all the ultrasound beams which have been sequentially projected toward the three-dimensional region are plotted on a mapping plane 16 (i.e. an X-Z plane 16) which is virtually set as a plane where the ultrasound beams pass through the three-dimensional region 12, an ultrasound image for the three-dimensional region is formed on the mapping plane. The ultrasound image corresponds to a three-dimensional ultrasound image obtained by the image processing apparatus according to the present invention.

FIG. 2B is an illustration which explains a three-dimensional ultrasound image obtained according to the present invention. Namely, by performing image data processing as described above for each of the echo data of the ultrasound beams which have been emitted toward the three-dimensional region 12, an ultrasound image 100 shown in FIG. 2B is obtained based on the brightness value data for the respective ultrasound beams.

Namely, the above described processing is sequentially executed for the echo data for all the ultrasound beams emitted toward the three-dimensional region 12. As a result, based on the brightness value data for the respective ultrasound beams, a single frame of an ultrasound image 100 for the three-dimensional region is formed. The thus-formed ultrasound image 100 is considered to be equivalent to the image plotted on the mapping plane 16 as shown in FIG. 2B.

Namely, in the ultrasound image 100, one [1] line 100a in the X direction corresponds to a single scanning plane 10. Further, the number of plots on the mapping plane 16 matches the number of ultrasound beams. This means that each of the ultrasound beams corresponds to one [1] pixel in the ultrasound image 100. In other words, in the present invention, one [1] ultrasound beam projected to the three-dimensional region corresponds to one [1] pixel in the ultrasound image 100.

The ultrasound image 100 is similar to an image obtained by viewing the three-dimensional region from a point from which the ultrasound beams are emitted. Thus, when the point of emitting the ultrasound beams is taken as a viewpoint, each of the ultrasound beams can be taken as a line of vision. This enables the diagnosed part (three-dimensional region) to be observed as if it were observed by the naked eye.

Figure 3:
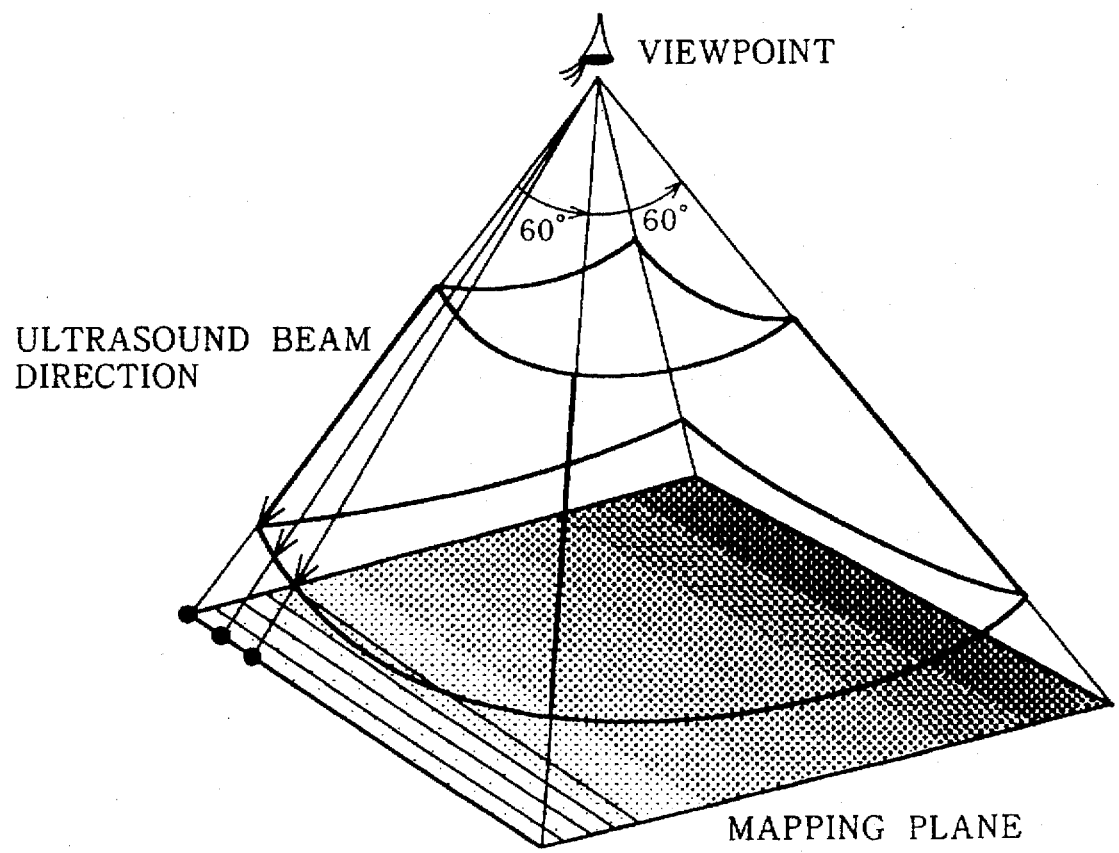
FIG. 3 is another illustration which explains a relationship between a three-dimensional region and a projected image.

FIG. 3 is an illustration which shows another relationship between a three-dimensional region 12 and a projected image. Specifically, in the case shown in FIG. 3, a scan is performed for a three-dimensional region by an ultrasound probe having a convex type array transducer such as the one disclosed in the above-mentioned U.S. patents.

More specifically, as shown in the drawing, the position of the ultrasound probe having a convex type array transducer is set at a position that is considered to be a viewpoint with respect to the three-dimensional region (an object), from which ultrasound beams are emitted toward the three-dimensional region. In the array transducer, ultrasound beams emitted from the both ends thereof define an angle of sixty [60] degrees to form a scanning plane therebetween. Further, the array transducer is swung through an angle of sixty [60] degrees to perform a mechanical scan. In this way, a scan is performed for the three-dimensional region.

During the scanning, the array transducer sequentially emits ultrasound beams toward the three-dimensional region and receives their echoes reflected therefrom. The received echoes are sequentially processed to generate brightness value data for the respective ultrasound beams along the respective directions of the projecting ultrasound beams. In the same manner as with the case shown in FIG. 1 in which an ultrasound probe 22 having a linear type array transducer is used, the brightness value data for each of the ultrasound beams corresponds to a brightness value at a corresponding pixel of an ultrasound image which is plotted on a mapping plane virtually set as a plane on which the ultrasound beams passing through the three-dimensional are projected. In this case shown in FIG. 3, the number of pixels in the ultrasound image matches the number of ultrasound beams.

As described above, in the three-dimensional ultrasound image according to the present invention, the directions of the ultrasound beams match the directions of lines of vision for image rendering. In other words, the ultrasound image is equivalent to an image which is obtained by using an ultrasound beam as a line of vision. Therefore, it is possible to produce a three-dimensional ultrasound image which is substantially the same as an image obtained by viewing the three-dimensional region (object) from a viewpoint from which the ultrasound beams are emitted.

Further, because the echo data for the respective ultrasound beams is processed each time the echo of the ultrasound beam is received, it is possible to produce brightness value data for the respective ultrasound beams in series. With this result, an ultrasound image of the already scanned part of a three-dimensional region can be constructed almost simultaneously with the displacement (scan) of an ultrasound probe. This, in turn, allows an ultrasound image of a three-dimensional region to be constructed almost simultaneously with a completion of the displacement (scan) of a probe. This eliminates the necessity for recording an enormous amount of three-dimensional data in a memory such as a geometry memory and rereading the same out from the memory for an image construction, thereby making it possible to produce a three-dimensional image on real time basis. In this way, it is possible to greatly reduce the duration required for constructing a three-dimensional image. Further, since no additional echo data memory such as a geometry memory is necessary, it is possible to reduce the number of parts and thereby provide a practical ultrasound diagnostic apparatus capable of producing a three-dimensional ultrasound image at a relatively low cost.

Generation of transparent image data (adjustment of opacity)—Volume rendering

As described earlier, according to the present invention, it is possible to display not only a stereoscopic surface image of an object placed in a three-dimensional region but also a stereoscopic transparent image of the object like an X-ray image as necessary (called by "Vol-mode image" by inventors). The transparent image data in this invention is generated by applying a volume rendering technique used in the field of computer image processing to an ultrasound image processing with features specific to ultrasound waves in mind. Thus, the principle underlying volume rendering is explained first with reference to FIG. 4, FIG. 5 and FIG. 6.

Figure 4:
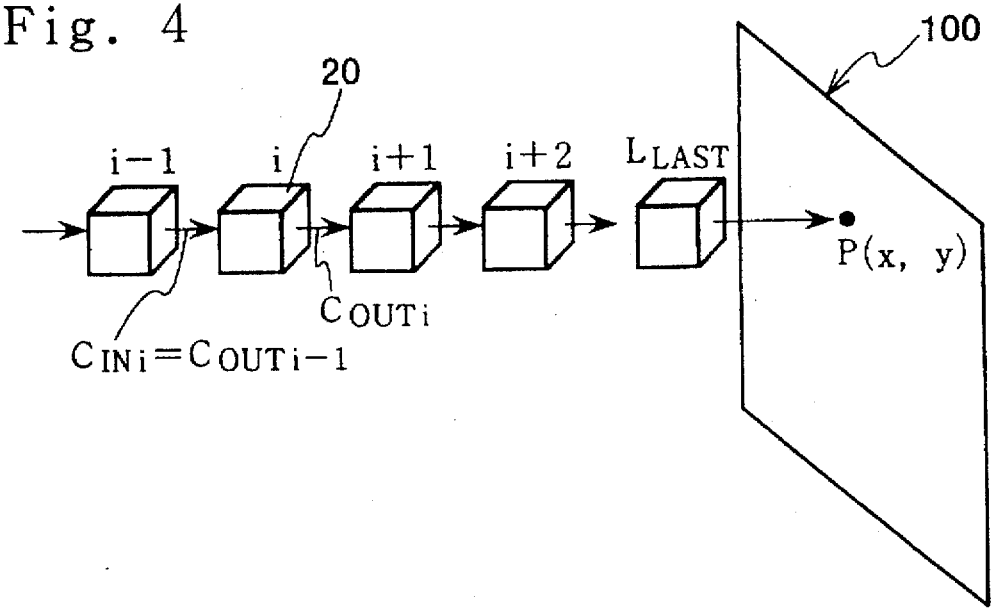
FIG. 4 is an illustration which shows a relationship between a quantity of inputted light and a quantity of outputted light at each voxel 20.
Figure 5:
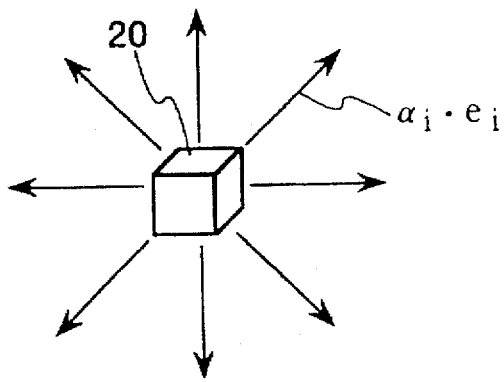
FIG. 5 is an illustration which explains a quantity of luminescence at each voxel 20.

In these drawings, FIG. 4 is an illustration for explaining a relationship between a quantity of inputted light and a quantity of outputted light at each voxel 20, and FIG. 5 is an illustration for explaining a quantity of luminescence at each voxel 20.

More specifically, FIG. 4 and FIG. 5 show the concept of a voxel 20. Here, it should be noted that one [1] voxel 20 corresponds to one [1] echo data which is obtained by A/D converting an echo signal obtained from an echo of an ultrasound beam. In other words, a voxel 20 is defined as a volume element at one of a plurality of sampling points. The sampling point is determined in correspondence with one [1] cycle of the A/D conversion rate of the A/D converter 36 (shown in FIG. 1) operating in synchronization with a sampling clock, as described later in further detail. That is, the voxel 20 can be understood as each one of a plurality of sampling points positioned along the beam projecting direction. Therefore, in the application of the volume rendering technique to the ultrasound image processing apparatus, an ultrasound beam is taken as a series of a number of voxels, and an ultrasound wave is assumed to be equivalent to light. In other words, in the present invention, echoes of ultrasound waves are visualized as an image on the assumption that the ultrasound waves are substituted by light.

FIG. 4 shows respective voxels 20 i−1 through $L_{LAST}$. A value obtained by processing a number of voxels of an ultrasound beam sequentially from the first (initial) voxel 20 corresponds to a brightness value P(x,y) of one [1] pixel in the ultrasound image 100 on a display screen.

Here, in accordance with the volume rendering technique, an opacity $\alpha$ and a transparency (1−$\alpha$) are defined for each voxel 20. The value $\alpha$ may be changed in accordance with the type of tissue. When absorption loss at a voxel 20 is ignored, all lights pass straight through or reflect in different directions at a voxel 20, as shown in FIG. 5. The opacity $\alpha$ correlates with the diffusion rate of an ultrasound wave at a voxel 20. More specifically, the opacity $\alpha$ is equivalent to the ratio of a voluntary luminescence of light at a voxel 20 to its surroundings against a quantity of inputted light. The transparency (1−$\alpha$) correlates with the transmission rate of an ultrasound wave at a voxel 20. More specifically, the transparency (1−$\alpha$) is equivalent to the ratio of the transmission of light at a voxel 20 which has been supplied from the preceding voxel. In this embodiment, the opacity $\alpha$ is set in a range between zero [0] and one [1]. That is, $0 \leq \alpha \leq 1$. In the present invention, the opacity $\alpha$ is defined as a function of echo data, and therefore it may be represented, for example, by the following mathematical Equation (1):

$$\alpha = \beta \times e^\gamma \quad (1)$$

Here, e represents a value of echo data. Specifically, e means the relative size of an echo at each sampling point after A/D converted into digital echo data. Therefore, in this specification, e is referred to as a normalized echo data. In this embodiment, the value of e is represented by bit data, for example, eight [8] bit data for producing a monochrome image or sixteen [16] bit data for producing a color image. And, $\beta$ represents an opacity adjustment coefficient variably chosen for emphasizing either a stereoscopic effect or a transparent effect in producing a stereoscopic transparent image. Further, $\gamma$ represents an echo strength adjustment coefficient which is a power for selecting the value e of the normalized echo data. The value $\gamma$ can be varied as necessary for the type of tissue at a voxel 20. A value preferably greater than one [1], for example, two [2] or three [3], is substituted into $\gamma$. Therefore, it is assumed here that $\gamma=2$ or $\gamma=3$. A user can arbitrarily choose the value $\gamma$ to adjust the image clarity to his/her particular needs for optimizing the image. As a result, the opacity a changes nonlinearly with respect to the value e of the normalized echo data.

As shown in FIG. 4, for an i-th voxel 20, a quantity of inputted light $C_{INi}$ and a quantity of outputted light $C_{OUTi}$ are defined. In this case, its quantity of inputted light $C_{INi}$ is equal to a quantity of outputted light $C_{OUTi-1}$ of an (i−1)-th voxel 20 that immediately precedes the i-th voxel 20. Thus, this relationship can be represented by the following Equation (2):

$$C_{INi} = C_{OUTi-1} \quad (2)$$

Here, it should be noted that that $C_{IN1}=0$ for a first voxel.

For each voxel, based on the above-described opacity a and transparency (1−$\alpha$), a quantity of luminescence and a quantity of transmitted light are defined. Thus, a quantity of luminescence of 1-th voxel 20 is defined as a product between an opacity $\alpha_i$ and normalized echo data $e_i$, that is, $\alpha_i \times e_i$. A quantity of transmitted light of i-th voxel 20 is defined as a product between a transparency (1−$\alpha_i$) and a quantity of inputted light $C_{INi}$, that is, (1−$\alpha_i$)×$C_{INi}$. In this case, the quantity of luminescence corresponds with the degree of contribution of the voxel 20 to a brightness value P(x,y) of the ultrasound beam at the corresponding pixel. Further, the value of a quantity of transmitted light corresponds to its transmission rate at a i-th voxel 20, when it is considered as a transfer medium of an ultrasound wave. Thus, if the value of the transparency (1−$\alpha_i$) at a voxel 20 is greater, its ultimate contribution to the brightness value P(x,y) also becomes greater.

Figure 6:
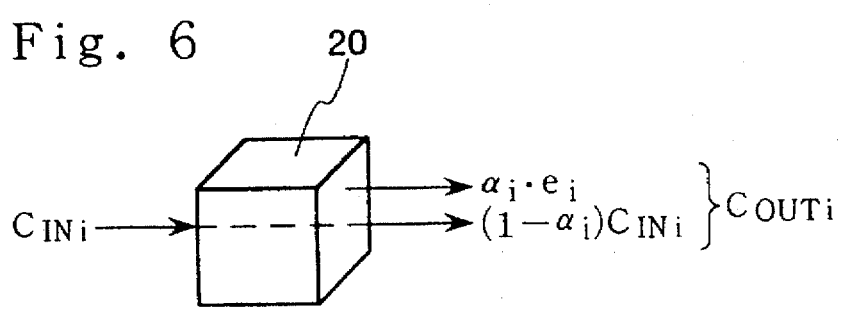
FIG. 6 is an illustration which explains a quantity of outputted light at each voxel 20.

FIG. 6 is an illustration which shows a quantity of outputted light at each voxel 20. As shown in FIG. 6, in the present invention the quantity of luminescence $\alpha_i \times e_i$ and the quantity of transmitted light (1−$\alpha_i$)×$C_{INi}$ at an i-th voxel 20 are added together as shown in the following Equation (3), to determine a quantity of outputted light $C_{OUTi}$ at the i-th voxel 20.

$$C_{OUTi} = (1-\alpha_i) \times C_{INi} + \alpha_i \times e_i \quad (3)$$

In Equation (3), it is to be noted that, from Equation (2), $C_{INi} = C_{OUTi-1}$. This means that the result of computing the quantity of outputted light at a preceding voxel is used in computing one at the current voxel.

While processing is carried out for a first voxel and its succeeding voxels sequentially in accordance with Equation (3), the opacity $\alpha_i$ at each of the voxels 20 is summed. And, when its sum $\Sigma\alpha_i$ reaches one [1], the processing ends. Here, the processing also ends when the processing reaches the voxel $L_{LAST}$ which is the last voxel or a voxel which corresponds to a preset depth. That is, an end determining condition for the processing is represented by the following Equation (4):

$$\Sigma\alpha_i=1 \text{ or } i=L_{LAST} \tag{4}$$

The end of processing upon satisfying the end determining condition $\Sigma\alpha_i=1$ in Equation (4) means that the processing is terminated when the cumulative value of the opacity $\alpha_i$ at each of the voxels 20 reaches one [1]. Of course, it is possible to change the end determining condition of Equation (4) so as to meet a particular situation. In this particular, a predetermined end determining value K, which is one [1] in this case, for setting a maximum of the sum $\Sigma\alpha_i$ may be changed to some other number.

In this embodiment, the quantity of outputted light $C_{OUT}$ at the voxel 20 at a time when the end determining condition is satisfied is considered to be the brightness value data of the ultrasound beam, that is, the brightness value P(x,y) at the corresponding pixel in an ultrasound image. The above-described processing is also carried out for the echo data for subsequently received ultrasound beams, and such processing is continued until it is completed for all the ultrasound beams emitted to a three-dimensional region.

As expressed in Equation (3), the brightness value P(x,y) at the pixel in the ultrasound image on a display screen reflects the values of all normalized echo data e of an ultrasound beam from a first voxel to a voxel judged to be an end. However, unlike a mere simple cumulative value of echo data as in the prior art described above, the brightness value obtained in accordance with the present invention reflects both scattering (diffusion) and absorption of an ultrasound wave at respective voxels. Accordingly, it is possible to effectively produce a stereoscopic transparent ultrasound image having a feeling of depth (a stereoscopic feeling) and a transparency like an image formed by a light emitted from a light source and transmitted through respective voxels with scattering and absorption. Further, it is also possible to visualize a part having an unclear boundary, that is, a boundary of tissues whose acoustic impedances are not so distinct from each other.

In connection with the application of the volume rendering technique to the present invention, it is to be noted that an image processing technology utilizing such a volume rendering technique has already been adopted in an X-ray CT apparatus. (Refer, for example, to IEEE Computer Graphics and Applications, Volume 8, Number 5, May 1988, pages 29–37.) However, since an X-ray CT apparatus detects an object with quantitative CT values irrespective of the direction of a projected X-ray, it is not possible to produce a stereoscopic image by using the detected data as they are. For this reason, in the X-ray CT apparatus, in order to produce a stereoscopic image, it is necessary to preset a virtual light source (viewpoint) and then process the detected data, on the assumption that the object is viewed from the viewpoint, by using a complex algorithm.

In contrast with the X-ray CT apparatus, in apparatuses using ultrasound waves, there are the following features. Namely, in the case of ultrasound waves, a relatively strong echo is obtained from a plane perpendicular to an ultrasound beam direction, while a relatively weak echo is obtained from a plane inclined with respect to the ultrasound beam direction. Further, a reflection from a hard part produces a strong echo, while a reflection from a soft part produces a weak echo.

Consequently, in image processing apparatuses using ultrasound waves having the above properties, obtained data, that is, the normalized echo data, reflect the feature of a tissue as well as the direction of an ultrasound beam with respect to an object, namely, an angle formed between the direction of a line of vision and the surface of an object. Therefore, in image processing apparatuses using ultrasound waves, it is possible to easily produce an image having a stereoscopic feeling (a depth feeling) by using the obtained echo data as they are. Namely, the application of a volume rendering technique to ultrasound image processing apparatuses has the advantage that it is possible to easily produce, with a relatively simple algorithm, a stereoscopic transparent image having a depth feeling of depth that has never been attained by a prior art device or method.

Figure 7:
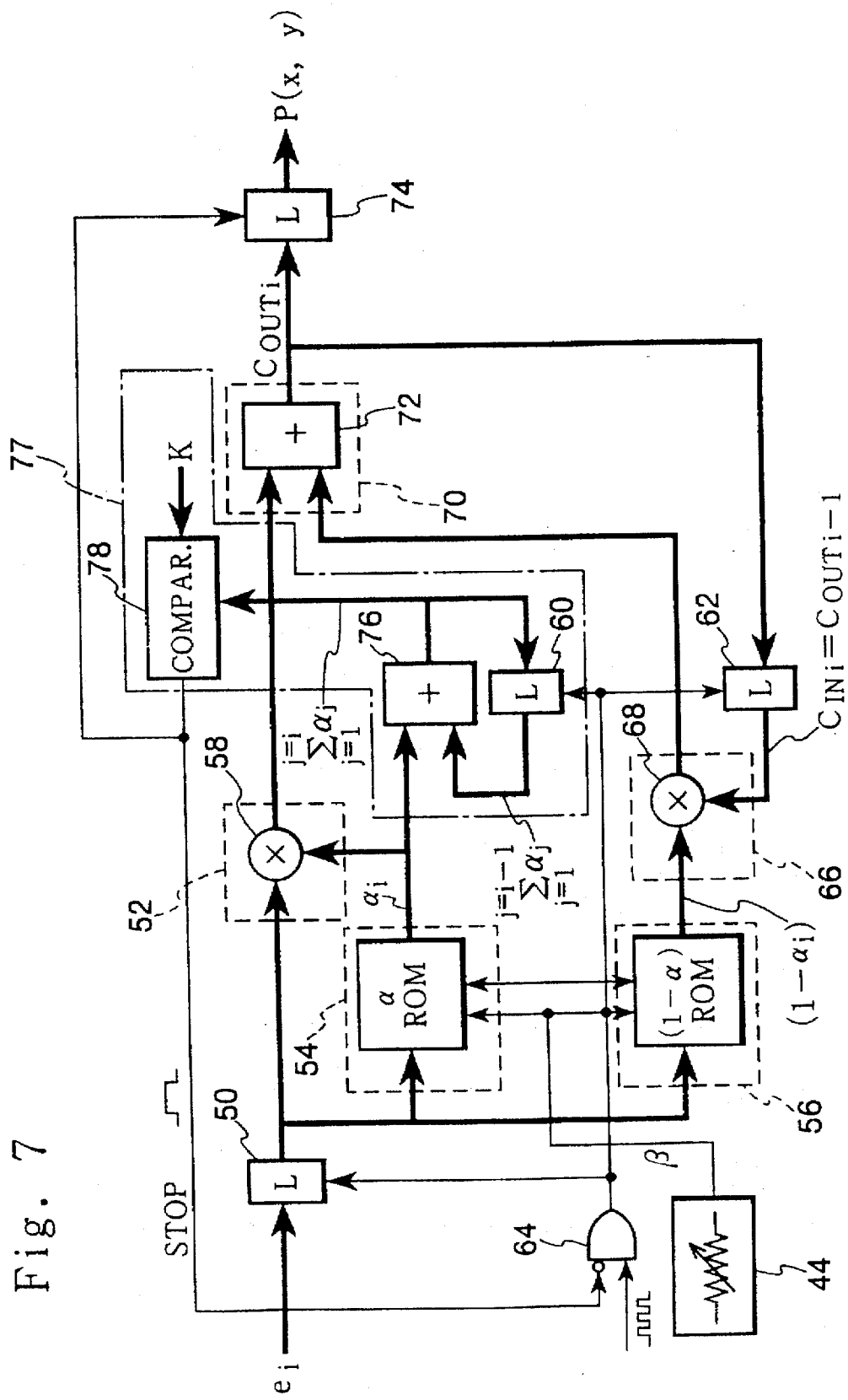
FIG. 7 is a block diagram illustrating a concrete example of the three-dimensional image data processing section 30 shown in FIG. 1.

FIG. 7 is a block diagram illustrating a concrete example of a circuit configuration of the image processor 38 shown in FIG. 1. As shown in FIG. 7, normalized echo data $e_i$ at an i-th voxel 20 which has already been A/D converted is sequentially inputted to the image processor 38. The inputted echo data $e_i$ is first latched by a latch circuit 50, and then it is inputted to a luminescence quantity operator 52, an opacity operator 54 and a transparency operator 56, respectively. The luminescence quantity operator 52 comprises a multiplier 58. The multiplier 58 calculates the luminescence quantity as a product $e_i \times \alpha_i$ by multiplying normalized echo data $e_i$ by an opacity $\alpha_i$ at each voxel 20. In this embodiment, the opacity operator 54 comprises an $\alpha$ ROM. The $\alpha$ ROM includes a table having data concerning a correspondence relationship between the normalized echo data $e_i$ and the opacity $\alpha_i$ at each voxel 20. Similarly, the transparency operator 56 comprises a $(1-\alpha)$ ROM, which includes a table having data concerning a correspondence relationship between the normalized echo data $e_i$ and the transparency $(1-\alpha_i)$ at each voxel 20.

Consequently, when the normalized echo data $e_i$ of an i-th voxel 20 is inputted into the opacity operator 54, the opacity operator 54 outputs opacity $\alpha_i$ at the voxel 20. Further, when the normalized echo data $e_i$ of the i-th voxel 20 is inputted into the transparency operator 56, the transparency operator 56 outputs transparency $(1-\alpha_i)$ at the voxel 20.

The opacity operator 54, the transparency operator 56, the latch circuit 50, a latch circuit 60 and a latch circuit 62 are all supplied via an AND gate 64 with a sampling clock. This sampling clock is also supplied to the A/D converter 36 shown in FIG. 1 for an A/D conversion. As a result, this sampling clock causes other circuits shown in FIG. 7 to operate in synchronization with the A/D converter 36. This enables normalized echo data e at each sampling point, that is, normalized echo data $e_i$ at each voxel 20, to be processed sequentially.

The output of the transparency operator 56 is supplied to a transmitted light quantity operator 66 which comprises a multiplier 68. The multiplier 68 multiplies a transparency $(1-\alpha_i)$ outputted from the transparency operator 56 by a quantity of outputted light $C_{OUT-1}$ of the immediately preceding (i-1)-th voxel 20 latched by latch circuit 62. Namely, the transmitted light operator quantity 66 outputs a quantity of transmitted light as a product $C_{INi} \times (1-\alpha_i)$ by multiplying a quantity of inputted light $C_{INi}$ of the i-th voxel by a transparency $(1-\alpha_i)$ at the voxel 20.

A light quantity adder 70 which is constructed from an adder 72 adds the quantity of luminescence to the quantity of transmitted light based on Equation (3), to output the sum as a quantity of outputted light $C_{OUTi}$ at the i-th voxel 20. The quantity of outputted light $C_{OUTi}$ outputted from the of light quantity adder 70 is supplied to a latch circuit 74 having a gate function and the latch circuit 62, respectively. That is, the quantity of outputted light at an i-th voxel 20 is fed back via the latch circuit 62 to the of transmitted light quantity operator 66 for computing a quantity of outputted light at an immediately succeeding (i+1)-th voxel 20.

An end determination section 77 determines an end of the above-described processing performed along the projecting direction of an ultrasound beam, that is, a series of voxels. More specifically, the end determination section 77 comprises an adder 76, a latch circuit 60 and a comparator 78. The adder 76 sequentially receives opacity $\alpha_i$ of respective voxels 20 as its input, while the adder 76 receives at its other input terminal an output from the adder 76 in a fed back manner via the latch circuit 60. This configuration allows the adder 76 to output from its output terminal a cumulative value $\Sigma \alpha_i$, which is the sum of the opacity $\alpha_i$ at each of voxels 20 summed sequentially from one at a first voxel 20.

The comparator 78 compares the cumulative value $\Sigma \alpha_i$ with a predetermined end determination value K. And when both values match, the comparator 78 outputs an end determination pulse. More specifically, the end determination section 77 outputs an end determination pulse when the cumulative value $\Sigma \alpha_i$, which is obtained by adding the opacity $\alpha$ of the respective voxels sequentially, reaches the predetermined end determination value K. The value K is usually set to one [1].

The end determination pulse is supplied to the AND gate 64 after having been inverted by an inverter at one [1] of its input terminals, and the end determination pulse halts a pass-through of the sampling clock. Further, the end determination pulse is also supplied to the latch circuit 74 to release a latch of a quantity of outputted light $C_{OUTi}$ of the voxels 20 outputted from the light quantity adder 70.

The quantity of outputted light $C_{OUTi}$ becomes the brightness value data of the ultrasound beam which corresponds to a brightness value P(x,y) at a pixel in an ultrasound image on a display screen. In this regard, it is to be noted that the pixel hold brightness value P(x,y) for the corresponding ultrasound beam whose echo data has been processed as described above. The thus-generated brightness value data is then fed to the DSC 28. In the DSC 28, the brightness value data for each of the ultrasound beams is sequentially stored in a predetermined address of a frame memory.

As previously described, not only when the above processing has been carried out for all the voxels including the final voxel 20 of an ultrasound beam, but also when the above processing has been carried out for the respective voxels preceding the voxel 20 corresponding to a preset depth along the beam direction, the end determination section 77 also halts processing echo data, in a manner similar to that described above. Namely, the end determination section 77 determines an end of processing, when processing reaches a voxel at a preset depth (or the final voxel), or when the sum $\Sigma \alpha_i$ of an opacity $\alpha_i$ at respective voxels 20 summed sequentially from one at a first voxel 20 reaches the predetermined end determination value K, which is usually set to one [1].

Consequently, in the case where respective values of opacity a of voxels on an ultrasound beam (a line of vision) which are to be sequentially added are large enough, the end determination section 77 halts the processing in a relatively early stage, to produce, for example, a transparent image only as far as the tissue surface, instead of deep into tissue entrails. In other words, if an opacity varying unit for varying the value of opacity is further provided, it is possible to set a desired value to the opacity $\alpha$ with respect to the normalized echo data e, which is used as a variable factor in the end determining condition of the end determination section 77.

As described above, according to the circuit configuration shown in FIG. 7, sequential processing for voxels 20 in each of a plurality of ultrasound beams starts from the first voxel 20 along the beam projecting direction. Therefore, a quantity of outputted light $C_{OUTi}$ at an i-th voxel 20 outputted from the quantity of light quantity adder 70 is sequentially used for computing a quantity of outputted light $C_{OUTi+1}$ at an immediately succeeding (i+1)-th voxel 20 in a feedback manner. In other words, in computing a quantity of outputted light $C_{OUTi}$ at an i-th voxel 20, the echo data of the preceding voxels are reflected thereto. As a result, in the brightness value data of the ultrasound beam which corresponds to the quantity of outputted light $C_{OUTi}$, the echo data of the respective voxels of the ultrasound beam are reflected, and the thus-obtained brightness value data 1s used as a brightness value P(x,y) for a pixel corresponding to the ultrasound beam. The brightness value data P(x,y) is sequentially stored in a predetermined address in the frame memory of the DSC 28 as the brightness value P(x,y) of the corresponding pixel.

Upon completion of processing the ultrasound beam as described above, the processing for a next ultrasound beam starts. When the above described processing is carried out for all the ultrasound beams, the brightness value data for the ultrasound beams are stored at predetermined addresses of the frame memory as brightness values at the corresponding respective pixels, from which a single frame of an ultrasound image for the three-dimensional region is produced. Thereafter, the brightness value data is read from the frame memory in the DSC 28 sequentially to display the ultrasound image on a display screen 42.

In addition, in this embodiment, the opacity $\alpha$ is determined in accordance with Equation (2), and the opacity adjustment coefficient $\beta$ in Equation (1) can be adjusted by the opacity adjuster 44. Accordingly, by appropriately adjusting the opacity adjuster 44, it is possible to adjust an emphasis on either the transparent effect or the stereoscopic effect of the ultrasound image, as well as the depth of a stereoscopic transparent image. Such adjustment can be carried out by adjusting an adjuster such as a dial or lever by an operator while observing the image displayed on a screen in real time.

Figure 8:
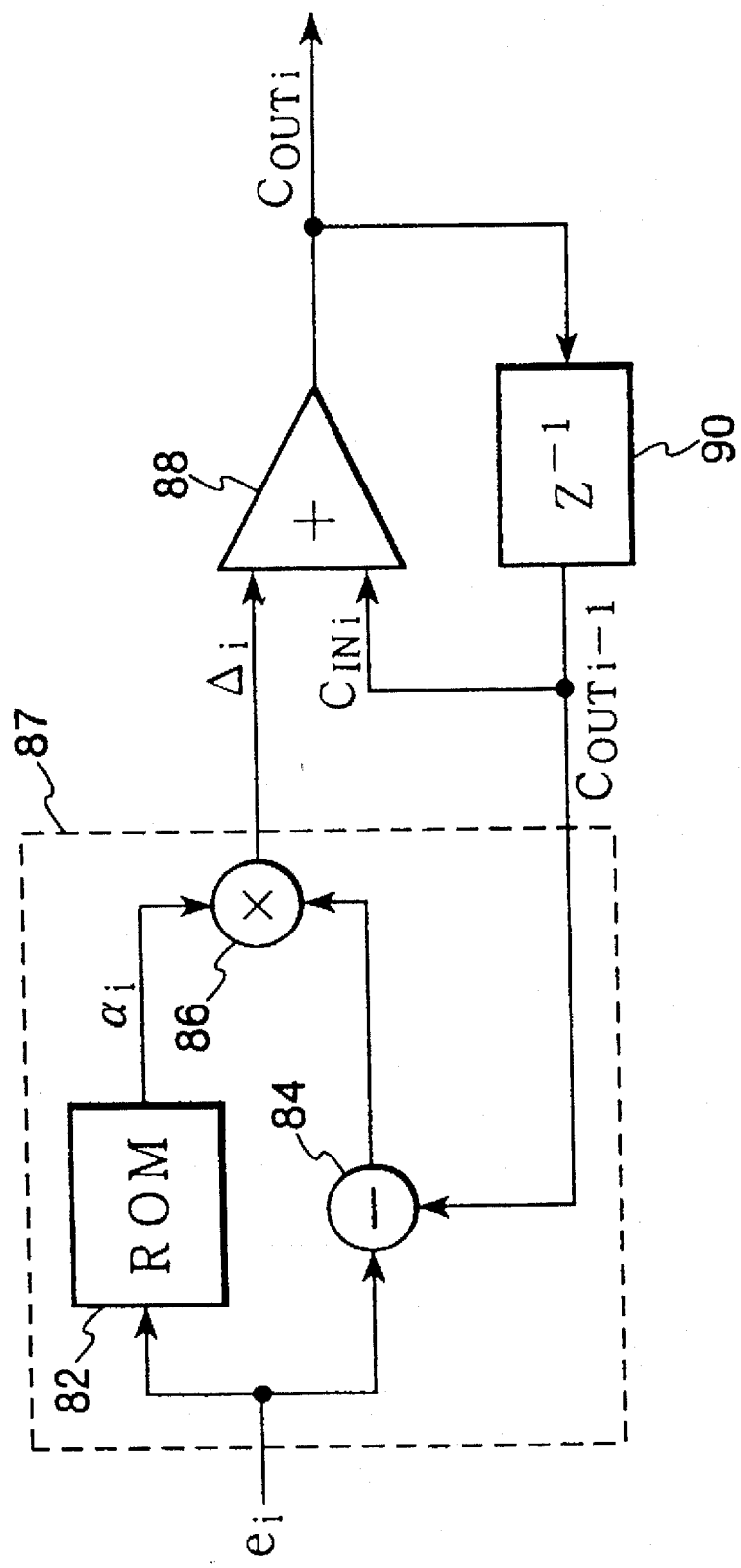
FIG. 8 is a block diagram illustrating a modification of the three-dimensional image data processing section shown in FIG. 7.

FIG. 8 shows another embodiment for the circuit configuration of the image processor 38 of the three-dimensional image data generator 37.

In this embodiment, the circuit configuration of the image processor 38 is simplified based on the transformation of Equation (3), in which the transparency is defined by $(1-\alpha_i)$. Namely, since the transparency $(1-\alpha_i)$ in Equation (3) is defined using opacity $\alpha_i$, the equation can be transformed as follows to apparently eliminate a factor of the transparency from the equation.

$$C_{outi} = (1-\alpha_i) \times C_{INi} + \alpha_i \times e_i \qquad (3)$$

$$= C_{INi} + \alpha_i \times (e_i - C_{INi}) \qquad (5-1)$$

$$= C_{INi} + \Delta_i \qquad (5-2)$$

Here, $\Delta_i = \alpha_i \times (e_i - C_{INi})$, and $\Delta_i$ is referred to as a modified quantity of light.

Namely, Equation (5-1) is transformed from Equation (3), and then $[\alpha_i \times (e_i - C_{INi})]$ in Equation (5-1) is replaced with $\Delta_i$ to obtain Equation (5-2). Namely, a quantity of outputted light $C_{OUTi}$ of the i-th voxel is regarded as the sum of a quantity of inputted light $C_{INi}$ and a modified quantity of light $\Delta_i$. In this case, a factor of the transparency $(1-\alpha_i)$ is latently contained in Equation (5-1), so that Equations (5-1) and (5-2) can be considered to be substantially the same as Equation (3) in principle.

The circuit configuration of the image processor 38 shown in FIG. 8 is constructed in accordance with Equations (5-1) and (5-2). In the circuit, a ROM 82 is constructed from a table having data concerning a relationship between echo data $e_i$ and opacity $\alpha_i$. Therefore, when echo data $e_i$ is inputted into the ROM 82, it outputs opacity $\alpha_i$ corresponding to the echo data. A subtracter 84 is provided to perform a calculation of $e_i - C_{INi}$. A multiplier 86 is provided to perform a calculation of $\Delta_i = \alpha_i \times (e_i - C_{INi})$. A portion 87 of the circuit in which the above calculation is performed may be constructed from hardware such as a ROM. An output $C_{OUTi-1}$ for an (i–1)-th voxel from an adder 88 is supplied to a delay circuit 90, and an output of the delay circuit 90 is supplied to the adder in a feedback manner to be added to a modified quantity of light $\Delta_i$ for an i-th voxel. In other words, an output of the delay circuit 90 is used as a quantity of inputted light $C_{INi}$ for an immediately succeeding (next) voxel and it is supplied to the subtracter 84 and adder 88, respectively.

According to the circuit configuration as described above, it is possible to simplify the circuit configuration for the image processor 38 shown in FIG. 7, thereby making it possible to reduce the manufacturing cost of the image processing apparatus.

The ultrasound image formed according to the present invention is advantageous in diagnosing a living body, since it is formed into a stereoscopic surface image of an object such as an organ or a fetus or a stereoscopic transparent image capable of displaying the object like an X-ray image. Also, according to the present invention, since the respective ultrasound beams emitted toward the three-dimensional region correspond to the respective pixels in an ultrasound image of the three-dimensional region, and since ROM tables having data concerning a relationship between a value of echo data and an opacity and data concerning a relationship between a value of echo data and a transparency are used effectively, it is possible to produce such a three-dimensional ultrasound image on real time basis.

In the embodiments described above, each of the opacity operator 54 and the transparency operator 56 is formed from an individual ROM, respectively. However, in the present invention using a binary digital circuit, it is possible to substitute these ROMs with a single common ROM.

In this modification, an output of the common ROM is inverted to obtain a complement of 1 [one], and a transparency $(1-\alpha)$ is computed based on the output from the ROM. In more detail, a transparency $(1-\alpha_i)$ is obtained by subtracting from one [1] an opacity a, outputted from the a ROM.

Further, although in the embodiments described above Equation (4) uses one [1] as a predetermined end determination value K, it is also possible to have a means for varying this value K. If such a means is provided, it becomes possible to adjust the picture quality of an ultrasound image while observing the ultrasound image on a screen which is being produced in real time.

Furthermore, in the embodiments described above, the viewpoint from which an object is considered to be seen matches the point from which ultrasound beams are emitted toward the object. However, the present invention is in no way limited to such a structure. It is possible to set the viewpoint to a different point from the beam emitting point. In such a case, another algorithm which is similar to one performed in the X-ray CT apparatus is additionally carried out for producing a three-dimensional image considered to be viewed from the viewpoint.

As described above, when the present invention is applied to an ultrasound diagnostic apparatus, it is possible to observe the inside of an object such as a living body through either of a stereoscopic transparent image or a stereoscopic surface image, thereby providing a diagnostically advantageous three-dimensional ultrasound image. In addition, the present invention has a further advantage in being able to form such an image on real time basis. Furthermore, the present invention enables the observable depth (distance) from a surface to be freely adjusted.

Therefore, application of the present invention to an ultrasound diagnostic apparatus is particularly useful for a prenatal diagnosis of a fetus. Further, it is needless to say that the present invention is equally suitable for diagnosing other parts of a living body, for example, a circulatory system such as a blood vein, as well as organs such as the kidney and the bladder.

Furthermore, if the present invention is applied to fault detectors, sonar (devices), and fish school detectors and the like, it becomes possible to provide a unique ultrasound image never obtainable by conventional apparatuses in which a stereoscopic transparent image of an object or a stereoscopic surface image of the object is freely selectable as necessary.

Moreover, in the embodiments described above, ultrasound waves are utilized to produce a three-dimensional image. However, the concept of the present invention does not eliminate use of other beams such as an electromagnetic wave. Therefore, it should be noted that the term "beam" in this application includes other beams besides ultrasound beam. As an example of the application using electromagnetic waves includes a rader or the like.

Finally, although this invention has been described in its preferred embodiments with a certain degree of particularity, it is to be understood that the present disclosure of the preferred embodiments can be changed in details of construction and that the combination and arrangement of parts may be changed without departing from the spirit and the scope of this invention as hereinafter claimed.

What is claimed is:

1. An ultrasound image processing apparatus, comprising:
    an ultrasound transducer for sequentially emitting ultrasound beams and receiving respective echoes of said ultrasound beams within a scanning plane;
    means for displacing said ultrasound transducer to move said scanning plane in a three-dimensional region;
    a three-dimensional image data generating means for sequentially obtaining echo data of the respective ultrasound beams from the echo of the respective ultrasound beams upon receipt of the echo by said ultrasound transducer, and for sequentially generating, based on the echo data of the respective ultrasound beams, brightness value data for each ultrasound beam corresponding to a brightness value for one pixel in an ultrasound image for said three-dimensional region;
    memory means, having addresses corresponding to respective pixels in said ultrasound image, for sequentially storing the brightness value data for the respective ultrasound beams generated by said three-dimensional image data generating means at the corresponding addresses thereof; and
    display means for displaying the ultrasound image of said three-dimensional region, based on said brightness value data stored in said memory means.

2. The ultrasound image processing apparatus as set forth in claim 1, wherein said image data generating means operates so that display means displays such ultrasound image that corresponds to an image which can be seen on a mapping plane which is virtually set as a plane on which said ultrasound beams passing through said three-dimensional region are projected, in which said ultrasound beams being emitted toward said three-dimensional region are assumed to be lines of vision.

3. The ultrasound image processing apparatus as set forth in claim 1, wherein the ultrasound transducer operates so that said ultrasound beams being emitted toward said three-dimensional region from said ultrasound transducer correspond to the pixels in said ultrasound image, respectively, and said memory means stores the brightness value data for each of said ultrasound beams as the brightness value for the corresponding pixel.

4. The ultrasound image processing apparatus as set forth in claim 3, wherein said memory means comprises a frame memory having addresses corresponding to the respective pixels in said ultrasound image.

5. The ultrasound image processing apparatus as set forth in claim 3, wherein each time said three-dimensional image data generating means generates the brightness value data for each of said ultrasound beams, said memory means stores the brightness value data for the ultrasound beam, and said memory means retains brightness value data for all of said ultrasound beams corresponding to the respective pixels in said ultrasound image, upon completion of scanning for said three-dimensional region.

6. The ultrasound image processing apparatus as set forth in claim 1, wherein said three-dimensional image data generating means comprises:

a transparent image data generating means for generating transparent image data which reflects a change of strength of the echo in the respective echo data at a plurality of sampling points of the ultrasound beam along the beam emitting direction thereof to the brightness value data for the ultrasound beam in such a way that such a change is visualized in the brightness value at the corresponding pixel of the ultrasound image.

7. The ultrasound image processing apparatus as set forth in claim 6, wherein said transparent image data generating means performs a volume-rendering operation for the echo data based on the assumption that the ultrasound beam is considered to be light, such that said generating means obtains a data considered to be a quantity of outputted light at each of said plurality of sampling points from respective echo data at each of said plurality of sampling points on said ultrasound beam, in which the quantity of the outputted light is related to the strength of echo obtained from the respective sampling point; sequentially operates the quantity of the outputted light at each of said plurality of sampling points along the beam projecting direction; and determines the brightness value data for said ultrasound beam, based on the result of the above operation.

8. The ultrasound image processing apparatus as set forth in claim 7, wherein said transparent image data generating means comprises:

an opacity operator means for obtaining, from the echo data at each of said plurality of sampling points on said ultrasound beam, an opacity at each of said plurality of sampling points, said opacity being defined by a value of the respective echo data;

a transparency operator means for obtaining, from the echo data at each of said plurality of sampling points on said ultrasound beam, a transparency at each of said plurality of sampling points, said transparency being defined by the value of the respective echo data;

a quantity of luminescence operator means for obtaining a quantity of luminescence at each of said plurality of sampling points, the quantity of luminescence being obtained by multiplying the echo data at each of said plurality of sampling points by said opacity; and a quantity of transmitted light operator means for obtaining a quantity of transmitted light at each of said plurality of sampling points, the quantity of transmitted light being obtained by multiplying the transparency at each of said plurality of sampling points by a quantity of outputted light at its immediately preceding sampling point; wherein the quantity of outputted light at each of said plurality of sampling points is obtained by adding the quantity of luminescence to the quantity of transmitted light.

9. The ultrasound image processing apparatus as set forth in claim 8, wherein said opacity is defined as a function of the echo data, and an opacity varying means is further provided for varying a coefficient included in the function.

10. The ultrasound image processing apparatus as set forth in claim 8, wherein said opacity operator means comprises a ROM table in which data corresponding to a relationship between the value of said echo data and said opacity are stored.

11. An ultrasound image processing method, comprising the steps of:

emitting a plurality of ultrasound beams from an ultrasound transducer sequentially to a three-dimensional region, and receiving their echoes by said ultrasound transducer;

sequentially obtaining echo data for the respective ultrasound beams from the echo of the respective ultrasound beams upon receipt of the echo by said ultrasound transducer, and for sequentially generating, based on the echo data of the respective ultrasound beams, brightness value data for each ultrasound beam corresponding to a brightness value for one pixel in an ultrasound image for said three-dimensional region;

sequentially storing the brightness value data for the respective ultrasound beams at predetermined addresses in a memory means; and displaying an ultrasound image in said three-dimensional region, based on the brightness value data for each of said plurality of ultrasound beams stored in said memory means, said ultrasound image being represented as if said plurality of ultrasound beams are utilized as lines of vision.

12. An ultrasound image processing apparatus, comprising:

ultrasound transducer means for sequentially emitting ultrasound beams along a scanning plane and for receiving respective echoes of said ultrasound beams;

means for displacing said ultrasound transducer means within a three-dimensional region including said scanning plane;

means for sequentially generating, based on echo data obtained from the echo of the respective ultrasound beams, brightness value data for each ultrasound beam corresponding to a brightness value for one pixel in an ultrasound image of said three-dimensional region, said brightness value data reflecting a change of strength of the echo in the respective echo data at a plurality of sampling points of each ultrasound beam along the beam emitting direction thereof so that such a change is visualized in the brightness value at the corresponding pixel;

memory means, having predetermined addresses corresponding to the respective pixels in said ultrasound image, for sequentially storing brightness value data for the respective ultrasound beams generated by said generating means at the predetermined addresses; and display means for displaying an ultrasound image of said three-dimensional region, based on said brightness value data stored in said memory means.

13. The ultrasound image processing apparatus as set forth in claim 12, wherein said generating means performs a volume-rendering operation for the echo data based on the assumption that the ultrasound beam is considered to be light, such that said generating means obtains a data considered to be a quantity of outputted light at each of said plurality of sampling points from respective echo data at each of said plurality of sampling points on said ultrasound beam, in which the quantity of the outputted light is related to the strength of echo obtained from the respective sampling point; sequentially operates the quantity of the outputted light at each of said plurality of sampling points along the beam projecting direction; and determines the brightness value data for said ultrasound beam, based on the result of the above operation.

14. The ultrasound image processing apparatus as set forth in claim 13, wherein said transparent image data generating means comprises:

opacity operator means for obtaining, from the echo data at each of said plurality of sampling points on said ultrasound beam, an opacity at each of said plurality of sampling points, said opacity being defined by a value of the respective echo data;

transparency operator means for obtaining, from the echo data at each of said plurality of sampling points on said ultrasound beam, a transparency at each of said plurality of sampling points, said transparency being defined by the value of the respective echo data;

quantity of luminescence operator means for obtaining a quantity of luminescence at each of said plurality of sampling points, the quantity of luminescence being obtained by multiplying the echo data at each of said plurality of sampling points by said opacity; and quantity of transmitted light operator means for obtaining a quantity of transmitted light at each of said plurality of sampling points, the quantity of transmitted light being obtained by multiplying the transparency at each of said plurality of sampling points by a quantity of outputted light at its immediately preceding sampling point, the quantity of the outputted light is related to the strength of echo obtained from the respective sampling point; wherein said quantity of outputted light at each of said plurality of sampling points is obtained by adding the quantity of luminescence to the quantity of transmitted light.

15. The ultrasound image processing apparatus as set forth in claim 14, wherein said opacity is defined as a function of the echo data, and an opacity varying means is further provided for varying a coefficient included in the function.

16. The ultrasound image processing apparatus as set forth in claim 15, wherein said opacity operator means comprises a ROM table in which data corresponding to a relationship between the value of said echo data and said opacity are stored.

17. An image processing apparatus, comprising:

means for sequentially emitting beams toward a three-dimensional region and receiving the reflected beams;

means for sequentially generating a brightness value data for each of the received beams each time the beam is received;

memory means having predetermined addresses corresponding to the respective beams, said memory means sequentially storing the brightness value data for the respective beams generated by said brightness value data generating means at the corresponding predetermined addresses; and display means for displaying an image of said three-dimensional region, based on said brightness value data stored in said memory means, in which the image is composed of a plurality of pixels, and these pixels correspond to the beams, respectively.

18. An image processing apparatus, comprising:

a transducer for sequentially emitting beams toward a three-dimensional region and receiving echoes of the beams reflected therefrom;

a three-dimensional image data generating means for sequentially obtaining echo data of the respective beams from the echo of the respective beams upon receipt of the echo by said transducer, and for sequentially generating, based on the echo data of the respective beams, brightness value data for each beam corresponding to a brightness value for one pixel in an image for said three-dimensional region;

memory means, having addresses corresponding to respective pixels in said image, for sequentially storing the brightness value data for the respective beams generated by said three-dimensional image data generating means at the corresponding addresses thereof; and display means for displaying the image of said three-dimensional region, based on said brightness value data stored in said memory means.

19. The image processing apparatus as claimed in claim 18, said beam is an electromagnetic wave.

20. The image processing apparatus as claimed in claim 18, said beam is an ultrasound beam.

21. An ultrasound diagnostic apparatus, comprising:

means for transmitting and receiving ultrasound beams to and from a three-dimensional region to scan the three-dimensional region;

means for producing brightness value data for the respective ultrasound beams based on an echo of each of the received ultrasound beams; and means for displaying a three-dimensional ultrasound image of the three-dimensional region based on the brightness value data for the ultrasound beams, in which pixels of the ultrasound image correspond to the ultrasound beams one by one.

22. An ultrasound diagnostic apparatus, comprising:

means for transmitting and receiving ultrasound beams to and from a three-dimensional region in which an object is placed to scan the three-dimensional region;

means for selectively producing a three-dimensional surface image data of the object or a three-dimensional transparent image data of the object based on echoes of the received ultrasound beams; and means for displaying a three-dimensional ultrasound image based on the ultrasound image data produced by the producing means.

23. An ultrasound diagnostic apparatus, comprising:

means for transmitting and receiving ultrasound beams to and from a three-dimensional region in which an object is placed to scan the three-dimensional region;

means for producing, based on echoes of the received ultrasound beams, a three-dimensional image data for a three-dimensional image of the object which can be varied from a three-dimensional surface image of the object to a three-dimensional transparent image of the object as desired; and means for displaying a three-dimensional ultrasound image based on the ultrasound image data produced by the producing means.

* * * * *